(No Model.) 6 Sheets—Sheet 3.

R. EICKEMEYER, Dec'd.
R. EICKEMEYER, Jr., Executor,
ELECTRIC LOCOMOTIVE.

No. 588,104. Patented Aug. 10, 1897.

Attest:
Philip F. Larner
Howell Little

Inventor:
Rudolf Eickemeyer
By ______ Attorney

UNITED STATES PATENT OFFICE.

RUDOLF EICKEMEYER, OF YONKERS, NEW YORK; RUDOLF EICKEMEYER, JR., EXECUTOR OF SAID RUDOLF EICKEMEYER, DECEASED.

ELECTRIC LOCOMOTIVE.

SPECIFICATION forming part of Letters Patent No. 588,104, dated August 10, 1897.

Application filed May 9, 1892. Serial No. 432,325. (No model.)

*To all whom it may concern:*

Be it known that I, RUDOLF EICKEMEYER, of Yonkers, in the county of Westchester and State of New York, have invented certain new and useful Improvements in Electric Locomotives; and I do hereby declare that the following specification, taken in connection with the drawings furnished and forming a part of the same, is a clear, true, and complete description of the several features of my invention.

My said invention consists in part of a novel braking arrangement which, while of special advantage when combined with slow-speed motors, such as shown in my United States Patent No. 453,167, dated May 26, 1891, wherein the motor is mounted on springs and the wheels are driven by parallel rods or pitmen, is also of value in other types of mechanism, such as those in which the connecting medium is composed of spur or bevel gears.

My improvement further consists of a circuit-controlling mechanism whereby the speed and torque of the motor can be varied and the motor reversed when desired. I also provide means to guard against the possibility of abnormal currents entering the motor, and, furthermore, I have provided means whereby the danger of disruptive discharge due to the rapid changes of magnetism in the motor-field is overcome.

After fully describing my improvements as embodied in the illustrated apparatus the several features deemed novel will be duly specified in the several clauses of claim hereunto annexed.

Referring to the drawings, Fig. 14$^\text{a}$ illustrates the locking device, to which the hand-lever is hinged.

Referring to Figs. 1 to 7, inclusive, it is to be understood that the electric motor A is of the type disclosed in my Letters Patent Nos. 358,340 and 443,671, and also in application, Serial No. 388,070, filed April 8, 1891. It is of the slow-speed variety, carried on a spring-mounted truck-frame A' and directly coupled, by means of pitmen and links $a$ $a'$, Figs. 3 and 4, (or $a^2$ $a^3$, Fig. 7,) to the driving-wheels B, after the manner of my disclosures in Letters Patent No. 453,167, dated May 26, 1891, and in the application now pending, Serial No. 388,070, filed April 8, 1891. The motor also embodies various features of invention heretofore disclosed in my Letters Patent No. 454,336, dated June 16, 1891, among which is the longitudinal inclosure of the armature and field coils by a portion of the iron shell of the motor, which also serves as the main part of the motor-frame proper, and said portion $b$ serves as an important central portion of the truck-frame A', also in accordance with my aforesaid Letters Patent No. 453,167. This portion of the iron frame which surrounds the armature longitudinally, in combination with novel features in field-winding now employed by me, constitutes a portion of my present invention, as will be hereinafter fully described. With a motor thus mounted beneath a car and centrally located between its four wheels the application of braking mechanism which will be accessible for operation at both ends of the car involves such complex conditions as to render it, as I believe, impracticable to employ any of the well-known organizations of chains and levers of which I am cognizant, and especially in view of the fact that the spaces between each axle and the under side of the sill-frame or floor of the car are needed for accommodating various portions of the electrical apparatus. I have therefore devised a novel combination of braking mechanism, which includes the usual and well-known vertical hand-brakes or winch-shafts $c$ and $c'$, surmounted by the usual hand-cranks (or wheels) and located at the ends of the two platforms of the car. To these shafts chains $c^2$ are secured, as usual, and these are connected with the outer ends of levers $c^3$, of a common form, these being fulcrumed at one end and centrally coupled to other chains $c^4$. As a novel feature, a lever-frame C, adjacent to the motor, is coupled to both of said chains $c^4$. This lever-frame is composed of two side pieces $d$ $d'$ and two end pieces $d^2$ $d^2$, all of which are flexibly coupled together. The sides $d$ $d'$ of this frame are parallel with each other, which is also true of the end pieces $d^2$ $d^2$, but each of the latter is curved laterally at one end to the point of its hinged connection with the appropriate side piece $d$ or $d'$, and therefore, although the frame is apparently substantially rectangular, it is in substance slightly rhomboidal, as would be more apparent if each end piece $d^2$ was extended in a straight line from one of its hinged connections to the other. The interior space horizontally inclosed by this frame is occupied by the electric motor A, to the sides of which brackets $d^3$ are attached. These brackets $d^3$ support the side portions $d$ $d'$ of this lever-frame C, and loose pin and slot connections, as shown, afford all necessary freedom of movement by the side pieces during the setting and releasing of brakes. Each side piece $d$ and $d'$ is coupled to its adjacent brake-beam $e$ by means of a rigid turnbuckle-link $e'$, which provides for an accurate and close adjustment of the brake-beam with relation to the frame-lever, and also with reference to the relations of the brake-shoes $e^2$ to the tread of wheels B. With this braking mechanism, when tension is applied to the chain by the manipulation of a hand-brake lever and shaft at either platform, the lever-frame C is subjected to torsional strain, because the chains are coupled thereto at diagonally opposite points in each instance at about one-third of the distance between the adjacent corner and the middle of the side piece $d$ or $d'$. These strains on the frame tend to change its form from that of a slightly-rhomboidal form to a more radically rhomboidal form, and therefore the central portions of the two sides $d$ $d'$ are made to forcibly approach each other, and in so doing they so pull on the turnbuckle-links as to effectually operate the brake beams and shoes. If a car be so arranged that one end is always to be the front end, thus calling for but one hand brake lever or winch, then the side piece $d$ or $d'$, which would then not be directly connected with the hand-brake shaft, would require only a short piece of fixed chain or other form of link connection in its place for controlling that portion of that side piece the same as if a regular winch-chain was connected thereto.

Figures 17, 18, 19, 22, 23, 24, 25:
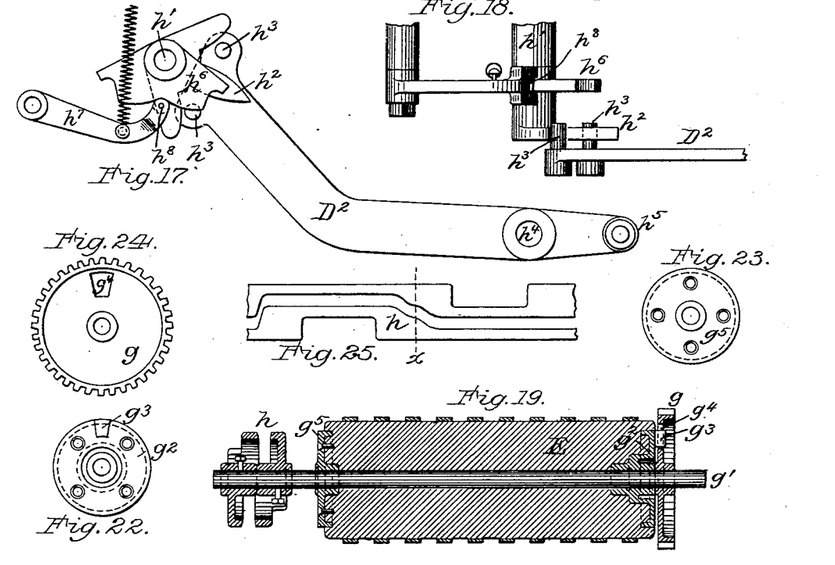
Figs. 17 and 18, in plan and edge views, illustrate the levers and accompanying mechanism, through which motion is imparted to the circuit-breaker from the shaft of the motor-controlling switch or cylinder.
Fig. 19 illustrates the motor-switch cylinder in section and its shaft with the cam thereon, which operates the circuit-breaker mechanism, Figs. 17 and 18.
Figs. 22 and 23 illustrate the end hub-plates of the motor-switch cylinder.
Fig. 24 illustrates the gear carried on the shaft of the switch-cylinder for locking with the hub-plate, Fig. 22, by means of the hole and lug, clearly indicated.
Fig. 25 is a plane projection or development of the cam on the motor-switch, which operates the circuit-breaker.

Without at this point describing the electrical system in detail I will now state that the circuit-breaker D and the motor-switch or controlling cylinder E are both mechanically operated by means of a diagonally-arranged shaft F, carried in hangers on the under side of the sill-frame of the car and constructed in sections detachably coupled, as at $f$, to facilitate disconnection for repairs. This shaft at its end is provided with bevel-gears $f'$ $f'$, and near the motor it carries a pinion $f^2$, which meshes with a large gear $g$ on the shaft $g'$ of the motor-switch cylinder E, and coupled thereto by means of a hub-disk $g^2$, having on its side a lug $g^3$, which occupies a socket $g^4$ in the gear $g$, as clearly indicated in Figs. 19, 24, and 22, a hub-disk $g^5$ at the other end of the cylinder being shown in Figs. 19 and 23.

Figures 20, 21, 26:
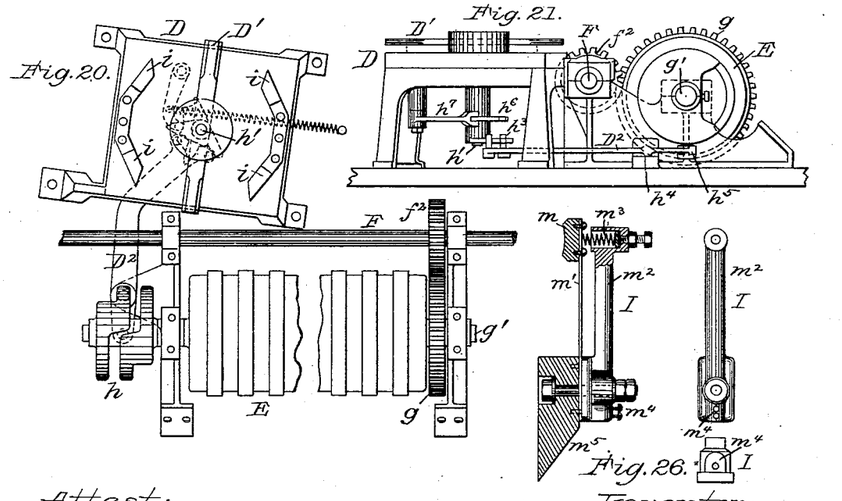
Fig. 20 illustrates the circuit-breaker and the motor-switching cylinder in plan view, with the cam which actuates the circuit-breaker.
Fig. 21 illustrates the mechanism of Fig. 20 in end view without the contact-plates of the circuit-breaker and also without the contact-blocks, which bear on the motor-switch cylinder.
Fig. 26, in three views, illustrates one of the contact-blocks with the wooden base therefor shown in section.

The mechanical connection of the diagonal shaft F with the circuit-breaker D is effected by way of the switch-shaft $g'$, which at the end opposite its gearing is provided with a slotted cam $h$, (shown in plane projection in Fig. 25,) provided with working faces capable of inducing short to-and-fro movements in the line of its axis with appropriate intervals of rest. The circuit-breaker arm D' is mounted upon one end of a shaft $h'$, which at its lower end is provided with a three-pronged arm $h^2$, Figs. 17 and 18. In the spaces between these prongs there are two pins $h^3 h^3$, carried on the free end of an elbow-shaped lever $D^2$, which near its opposite end is fulcrumed at $h^4$ and carries at its adjacent end a roller-stud $h^5$, which, as shown in Figs. 20 and 21, occupies the slot in the cam $h$. The studs or pins $h^3$ are so widely separated that the lever $D^2$ has considerable free movement prior to actuating the pronged arm $h^2$ and the circuit-breaker arm D' in either direction, and the latter is securely held against accidental rotation when at rest and in either one of its three appropriate positions by means of a three-faced jockey-cam $h^6$ on the axial shaft $h'$ and a spring-actuated tripping-lever $h^7$, fulcrumed at one end and having at its free end a roller $h^8$, bearing upon the face edge of the jockey-cam. This tripping-lever and jockey-cam also operate automatically for promptly actuating the circuit-breaker arm D' during its final movements in assuming either of its three positions of rest whenever the cam $h$ and lever $D^2$ have been operated positively to the required degree. The contact-plates $i$ of the circuit-breaker present four bearing-faces, and whichever way the arm D' may be turned it will couple the two diagonally opposite faces, the main or supply circuit being broken when the arm stands free from said plates, as shown in the several figures.

It will now be understood that the normal position of rest by the arm D' is assured when the stud $h^5$ on the elbow-lever $D^2$ occupies the central position between the working faces of the cam $h$, (indicated by the line $x$, Fig. 25,) that being the point from which the cam is rotated in starting the motor in either direction and to which it is returned for stopping.

It may here be stated that somewhat less than one-half of a revolution of the motor-switch cylinder in one direction from a given point is sufficient for securing all of the appropriate combinations of electric connections in passing from a halt to full speed, and that a trifle less than one-quarter of a revolution will provide for slow speed; also, that on returning the motor-cylinder to its initial position all of the effective electric connections will be cut out, and also that if this return movement be continued or extended in the same direction the motor will be reversed and driven backwardly, but never faster than at slow speed, so long as the switch is operated from that end of the car which for the time being is the proper front end. This arrangement enables the car-driver without leaving the front platform to promptly stop and to as promptly retreat with his car if deemed necessary.

Now for enabling the car-driver to mechanically operate the switch and circuit-breaker with due precision I have devised a unison-stop which automatically coöperates with the hand-lever during its manipulation by the driver, and by serving to effectually prevent any undue rotative movement of the hand-lever assures consequent safety to the motor-switch and the entire communicating electrical system.

The car-driver's operating mechanism is best illustrated on Sheet 3 of the drawings. The beveled gear $f'$ on the diagonal shaft F is engaged by a smaller bevel-gear on a vertical shaft K, housed in a tubular standard G, having on its upper end an enlarged hollow cap G', which has at one side a vertical slot, as clearly indicated in Figs. 8 to 12, inclusive. The upper end or top of the shaft K is provided with a fixed hub K', (separately shown in Fig. 14$^a$,) peculiarly shaped and provided with a transverse hole for the reception of a locking-pin, by which the hand lever or crank H may be pivotally mounted on said hub, so that the hand-crank while rotatively locked to the hub and shaft its outer end may be tilted upwardly.

Figure 14:
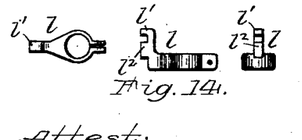
Fig. 14, in several views, illustrates a stop-nut for restricting the movement of the hand-lever.
Figure 14A:
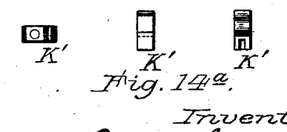

The hub K', as shown in Fig. 14$^a$, is flat-sided, has a central hole for the top of the shaft, a lug at the rear edge for the hole which receives the transverse pin for hinging the crank, and at its rear edge the hub is slotted at the bottom for receiving and engaging with a transverse key or lug on the shaft, thus rotatively coupling the shaft and hub, but permitting the latter to be freely lifted from the shaft. Below said hub and within the cap G' the shaft K is screw-threaded and provided with a peculiarly-shaped stop-nut $l$, (separately shown in Fig. 14,) having an arm which projects outwardly through the slot in the hollow cap G', thus preventing the nut from rotating while free to be moved up and down on the screw by the rotation of the shaft K. The outer end of the stop-nut is elevated above its hub or threaded portion and is provided with two shoulders or wards $l'$ $l^2$, separated by a notch. The hand-lever H (separately shown in Fig. 13) is provided with a rigid pendent arm $l^3$, having two laterally-projecting fingers $l^4$ $l^5$, which correspond in form with the wards $l'$ $l^2$.

Figures 1, 2:
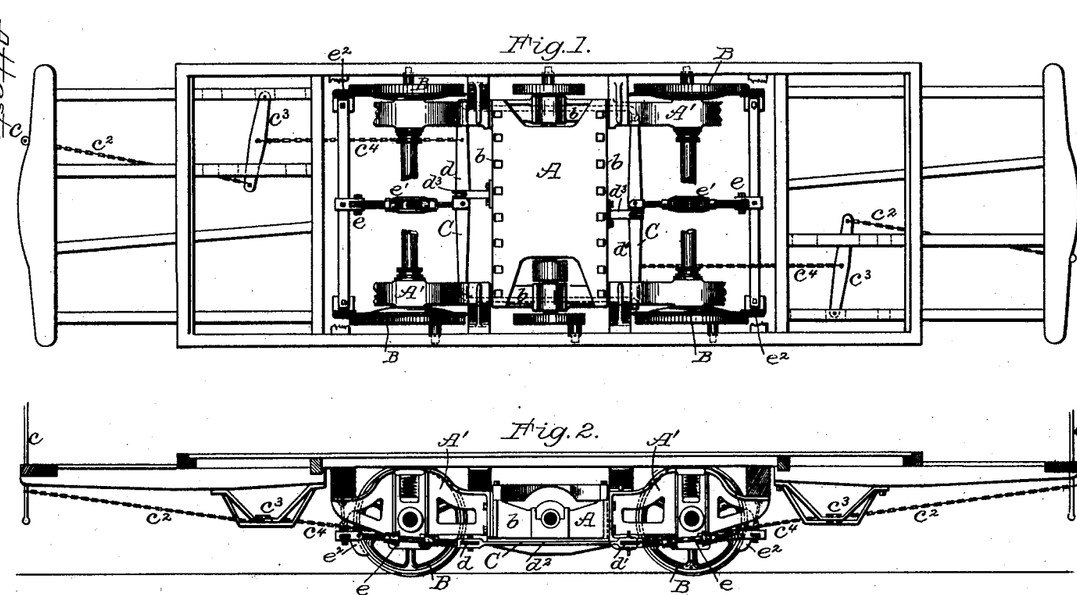
Figure 1 is a plan view of a locomotive or motor-car truck and its sill-frame, certain portions of the latter being removed for disclosing my braking mechanism.
Fig. 2 is a longitudinal vertical section of the motor-truck with the car-flooring added.
Figure 3:
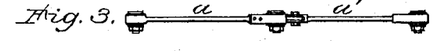
Figs. 3 and 4, in top and side views, illustrate the pitmen and links which couple the motor with the four driving-wheels.
Figure 4:
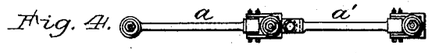
Figures 5, 6, 7:
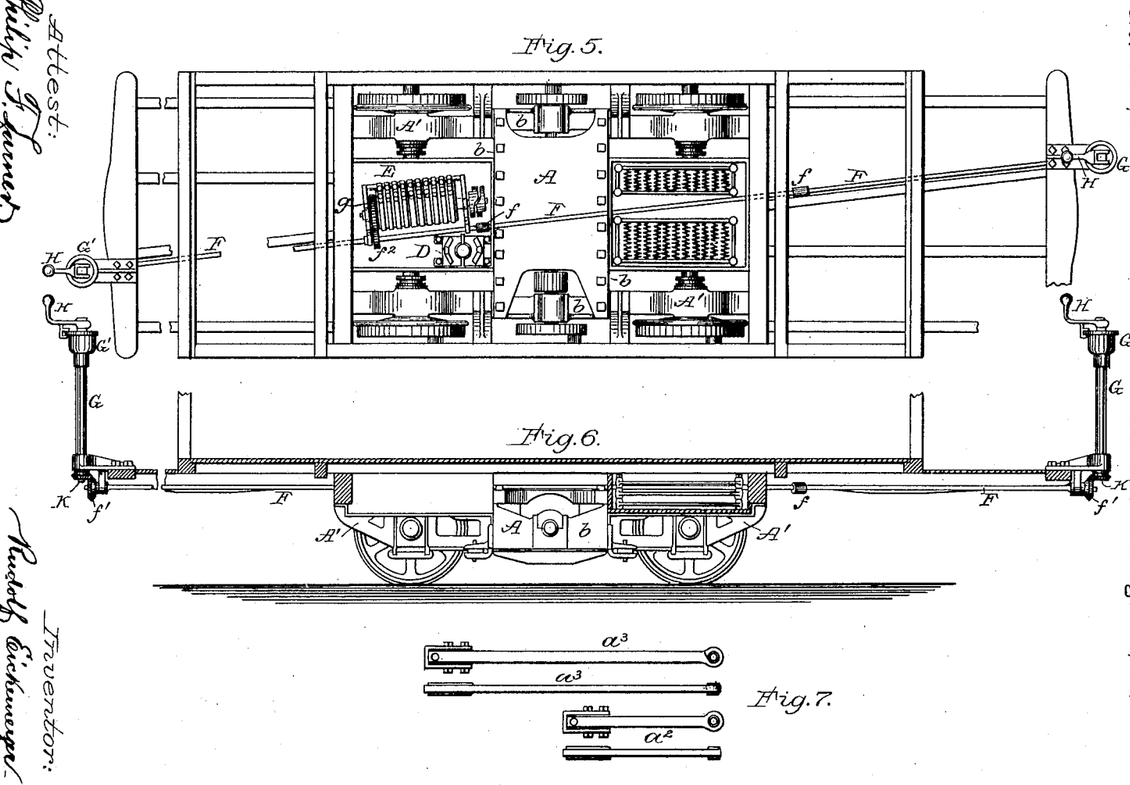
Figs. 5 and 6 illustrate, in plan and longitudinal vertical section, respectively, the truck and framing, with special reference to illustrating my motor-controlling mechanism, which is, as usual, accessible to the car-driver at both of the end platforms.
Fig. 7, in several views, illustrates another form of pitman, with its connecting-rod, for use as substitutes for those shown in Figs. 3 and 4.
Figures 8, 9, 10, 11, 12, 13, 15, 16:
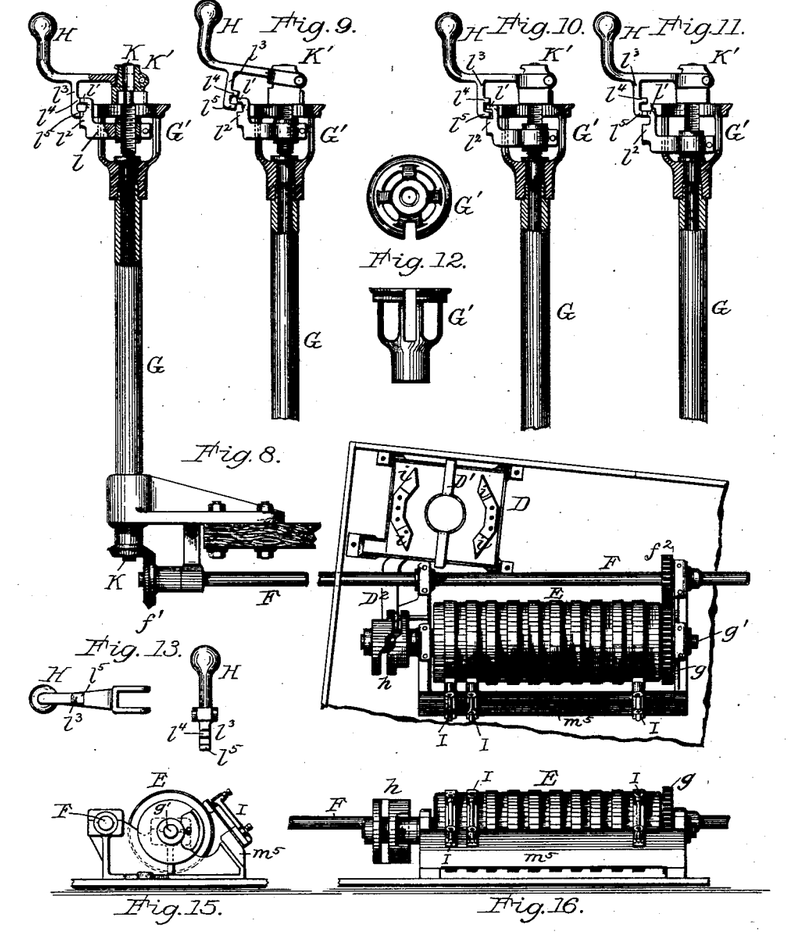
Fig. 8 illustrates the driver's hand crank or lever and its connection with the motor-controlling switch, and the current-key or circuit-breaker, these latter being in plan view.
Figs. 9, 10, and 11 illustrate the car-driver's hand-lever in the various positions required for controlling the motor.
Fig. 12, in top and side views, illustrates the top of the standard, which contains a rotary shaft surmounted by the driver's hand-lever.
Fig. 13, in two views, illustrates said hand-lever detached.
Fig. 15 illustrates, in end view, the motor-switch or controlling cylinder, with its communicating contact-blocks.
Fig. 16 illustrates said cylinder in side view with all but three of its contact-blocks detached.

Now referring to Fig. 8 it will be seen that the rear sides of the wards $l'$ $l^2$ are abutted by the coincident sides of the hand-lever fingers $l^4$ $l^5$, leaving the hand-lever free to be rotated backwardly or away from said wards. It will also be seen that when the hand-lever is in this position the motor must be at rest, the circuit-breaker arm D' being midway between the contact-plates. Upon rotating the hand-crank one revolution the stop-nut $l$ will be so far moved downwardly by the screw-thread on the shaft K that the arm-fingers $l^4\ l^5$ of the hand-crank may pass freely by the wards $l'\ l^2$, as shown in Fig. 10, the motor by that time having such of its electric connections made as to drive the car forwardly at slow speed. One more rotation of the hand-crank will cause the stop-nut to descend still lower until the upper ward $l'$ is abutted by the lower finger $l^5$ of the hand-crank arm $l^3$, as shown in Fig. 11, the motor then being in operation at full speed. By reversing the movement of the hand-crank the stop-nut will be raised to its original position, as in Fig. 8, and the current cut off from the motor, thus enabling the car to be stopped, as by its brakes under ordinary circumstances. If, however, a collision is to be avoided or the car is to be run backwardly, the normal restriction is evaded by the car-driver, who then tilts the hand-crank into the position shown in Fig. 9, thus avoiding the stop-nut and permitting him to continue the backward rotation of the crank by one revolution, which will so set the circuit-breaker and so revolve the motor-switch cylinder that the motor will be reversed, but supplied with current in such a manner that only slow speed can be attained, the stop-nut then being raised as far as it can go, and for then stopping the car the hand-crank need only be turned back again and restored to its normal position of rest, as in Fig. 8. Only one of these hand-cranks will be used on a car, it being readily detachable for transferring it to the corresponding vertical shaft at the opposite end of the car. Inasmuch as the tilting manipulation of the hand switch-lever H serves to avoid the stop it is obvious that said lever may be incapable of tilting if the pendent arm $l^3$ be pivoted at its junction with the lever, so that it may be swung outwardly by special manipulation, although this arrangement would be somewhat less convenient than the tilting lever.

Figure 27:
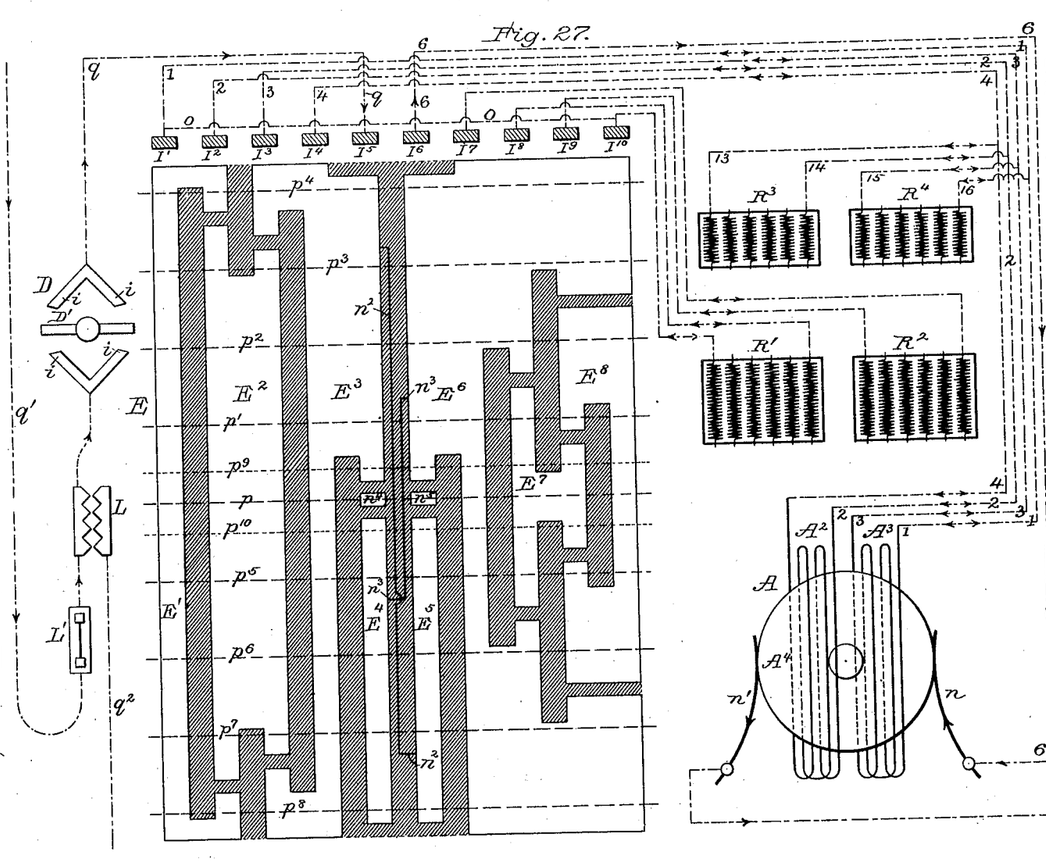
Fig. 27 is a diagrammatic illustration of a complete electric system as devised by me and as usually employed in my locomotives, the motor-switch cylinder having its surface shown in a plane projection or development, the several parallel dotted lines thereon indicating the various positions occupied by the surface of the cylinder with relation to the several contact-blocks riding thereon.

It should now be observed that the motor-switch cylinder is provided with a series of specially-formed contact-plates, which form in one instance ten, in another nine, metallic rings surrounding the switch-cylinder and in part connected with each other. These connections could not well be illustrated in Figs. 5, 8, 15, 16, 19, and 20, and hence the surface of the cylinder is shown as consisting of separate rings. The series of contact-blocks (or brushes) which coöperate with the switch-cylinder are shown in Fig. 27, and they are variously shown in previous figures, and one of the brushes is shown in detail in Fig. 26. The block-brush I, considered as a complete structure, embodies a concave-faced block $m$, secured to the outer end of a spring-arm $m'$, which is overlaid by a rigid arm $m^2$, provided at its outer end with an adjustable spring $m^3$, which bears upon the back of the block $m$ and its arm. At its rear end said rigid arm $m^2$ is provided with a screw-clamp $m^4$ for the reception of a conducting-wire terminal, and the whole is securely bolted to a wooden base $m^5$, upon which all of the block-brushes (or contacts) are mounted.

The electrical organization usually employed in my locomotives is fully illustrated in Fig. 27. In the diagram shown the motor A, with its field-coils in two sections $A^2\ A^3$, and its armature $A^4\ A^4$ and brushes $n\ n'$ are clearly indicated, and so also is the circuit-breaker D and the motor-switch cylinder E, the surface of the latter being clearly indicated in plane projection, with its several contact-plates $E'$, $E^2$, $E^3$, $E^4$, $E^5$, $E^6$, $E^7$, and $E^8$. These plates $E'$, $E^2$, $E^7$, and $E^8$ are insulated from each other by insulating matter, shown in dark ground. The plate $E^3$ is electrically connected with the plate $E^5$ by way of conductor $n^2$, passing through the insulating material of the switch-cylinder, and the plate $E^4$ is in like manner connected with the plate $E^6$ by way of conductor $n^3$. Two small plates $n^4\ n^5$, insulated from each other and from the other plates, serve as resting-contacts for the brush-blocks, which are connected the one with the line and the other with one armature-brush of the motor. The face of the cylinder thus described is divided longitudinally by a series of dotted lines for defining certain of the positions occupied by the several spring contact blocks or brushes I during the rotative movement of the cylinder, which is restricted to less than one revolution. As for instance, a dotted line $p$ indicates the position of rest, and movement toward and past line $p'$ to line $p^2$ brings the motor to slow speed, then moving toward and past $p^3$ and on reaching $p^4$ full speed is secured in a forward direction. If, however, the cylinder be moved from line $p$ in the opposite direction past line $p^5$ to $p^6$, (and even farther,) the motor will be reversed in direction for driving a car backwardly, but only slow speed can be had, while the driver is at the then front end of the car.

The several contact blocks or brushes I are ten in number and are appropriately designated. The contact-block $I^5$ is the initial block, or, at least, it is the one directly connected by way of wire $q$ with the circuit-breaker D, to which the main current by way of the trolley passes by way of wire $q'$, lightning-arrester L, and fusible plug at $L'$, the lightning-arrester having a ground-wire $q^2$ connecting with the truck-frame and wheels of the locomotive or otherwise grounded.

The operation of the motor-switch will now be described, after again referring to Figs. 20, 21, and 25, and stating that when the roller-stud $h^5$ on the lever $D^2$ occupies a central position between the working faces of the cam $h$ (line $x$, Fig. 25) the several contact-blocks $I'$ to $I^{10}$, inclusive, will occupy the line $p$ on the motor-switch cylinder E, Fig. 27, and hence a rotative movement of said cam and cylinder in either direction will swing the circuit-breaker arm D' into contact with one or the other pair of diagonally opposite contacts $i$, so as in either case to afford a closed circuit between the trolley-wire $q'$ and the motor-switch. Now assuming the several brush-blocks I' to I$^{10}$ to occupy the said contact-line $p$ on the switch-cylinder (the motor then being at rest) it is to be understood that for driving the car forwardly the proper initial rotation of the car-driver's hand crank or lever H will move the surface of the cylinder from the line $p$ toward said line $p'$, thus causing the circuit-breaker D to be promptly operated at the moment when the brush I stands on the line $p^9$. When in this position, the current from the trolley-wire passes from I$^5$, through block E$^3$, to I$^4$, via wire 4 to field-coil A$^2$, via wire 2 back to brush I$^2$ and over brush I$^3$, via wire 3 to field-coil A$^3$, and over wire 1 to brush I', but not through said brush, the circuit then extending from wire 1, by wire $o$, past brush I$^{10}$, through resistance R', back to brush I$^8$, to switch-plate E$^7$, to brush I$^9$, out and through resistance R$^2$, back to brush I$^7$, to switch-plate E$^6$, to brush I$^6$, and then out on wire 6, through the armature A and over brush $n'$ to the return-circuit, either the rails or a second trolley-wire. Therefore in this intermediate position $p^9$ the current passes in series through both field-coils A$^2$ and A$^3$, both rheostats R' and R$^2$, and the armature A$^4$. In position $p'$, which is the first and gives very slow running speed, being reached by one-half revolution of the crank-lever, the block E$^8$ makes contact between I$^{10}$ and I$^9$. The current passes through only one rheostat R$^2$, while rheostat R' is cut out. The next position, being arrived at by one whole turn of the crank-lever, is that of slow speed. Now block E$^6$ has made connection from I$^8$ to I$^7$, and the current flows through both rheostats in multiple arc. In passing to position $p^3$, that of half speed, the rheostats are short-circuited by the block E$^6$, establishing connection between all the brushes I$^6$ to I$^{10}$, so that the current on leaving the field-coils passes over connecting-wire $o$ to I$^{10}$, and through E$^6$ to I$^6$, over wire 6 to the armature-brush $n$. The connections of the field-coils A$^2$ A$^3$ have remained unchanged during the change of position from $p'$ to $p^3$, remaining in series connection. In position $p^4$, that of full speed, the field-coils A$^2$ and A$^3$ are connected in multiple arc, brush I$^5$ is connected by E$^3$ with I$^4$ and I$^3$, the current passing over 3 and 4 into the field-coils A$^2$ and A$^3$ and back over 1 and 2 to brushes I' and I$^2$, which are connected by block E', thence over connecting-wire $o$, brush I$^{10}$, block E$^6$, brush I$^6$, and wire 6, to the armature.

For stopping the motor the car-driver's crank H on being turned backwardly to its normal position correspondingly rotates the motor-switch backwardly, the order of the several changes described being thereby reversed, as follows: the field-coil sections changing from multiple arc to series and the two resistance-coils put in in multiple arc then the one resistance is cut out, then both resistances connected in series, and then upon reaching the original position the circuit-breaker is operated and the current cut off, thus enabling the car to be stopped by backing the car-driver's handle H, then abutting against the stop-nut and preventing from further rotation in that direction except when specially manipulated for that purpose.

The adverse effect of extra currents is guarded against by shunting each of the divisions of the field-coil A$^2$ and A$^3$ by a resistance R$^3$ R$^4$, which affords a path for the extra currents induced in the field, and this guarding effect is supplemented or enlarged by that portion of the casing of the motor which surrounds the armature longitudinally and affords a path for an extra current induced by a change of the field magnetism in the machine.

The field-coil division A$^2$ is in shunt-circuit with the resistance-coil R$^3$ by way of wires 13 and 14 and the division A$^3$ with resistance R$^4$ by way of wires 15 and 16, thus always affording a path for any extra current in the field-coils which may have been developed therein.

The motor and car having been stopped, if it be desirable to reverse the motor and drive the car backwardly, the car-driver tilts the crank H, so that it will be freed from the stop-nut, and rotates it farther in the same direction as that in which it was moved for stopping the car, as before indicated. But one such rotation of the crank can be made, and this causes the circuit-breaker arm D' to be thrown in a direction opposite to that before described, but this, as before, promptly connects the motor with the line. The switch-cylinder in moving its surface from the line $p$ (on which the brush-contacts rest) toward and beyond the line $p^5$ operates as before described, only now the current entering from the trolleys over fuse, breaking-switch, and lightning-arrester to brush I$^5$ passes from block E$^4$, via connections $n^3$, to block E$^6$, thence through resistances R' and R$^2$, first in series, next in multiple arc, but always in the opposite direction to the direction of the current in position $p^9$ to $p^4$, until when in position $p^7$ the resistances R' and R$^2$ are short-circuited and the current passes directly from E$^6$, over I$^{10}$, through $o$ to I', and through the field-coils A$^2$ and A$^3$, first in series, next in multiple arc, but in the opposite direction to that in position $p^9$ to $p^4$, thereby causing the motor to reverse the direction of rotation. From E$^3$ the current passes over $n^2$ to E$^5$ and by brush I$^6$ over 6 to the armature A$^4$ in the same direction as before and thence to the return-circuit. The switch-cylinder under these circumstances being restricted in its movement in this direction to a little less than one-quarter of a revolution, because of the restriction of the car-driver's crank or lever to one rotation, the motor can only be operated at slow speed. If, however, without this restriction the switch-cylinder should be rotated to line $p^7$ and thence to $p^8$, which can be done only from the opposite platform, the motor and car would be driven backwardly at half and then at full speed in like manner as when passing from lines $p^3$ to $p^4$ for driving at half and full speed forwardly.

The car-driver's crank on being brought backwardly to its normal position will cause the several changes to occur in the reverse order, and the crank being brought to the unison stop will cause the circuit-breaker to operate. To again cause the motor to move forwardly, the crank must be tilted to pass the stop and rotated, as before described.

Figure 28:
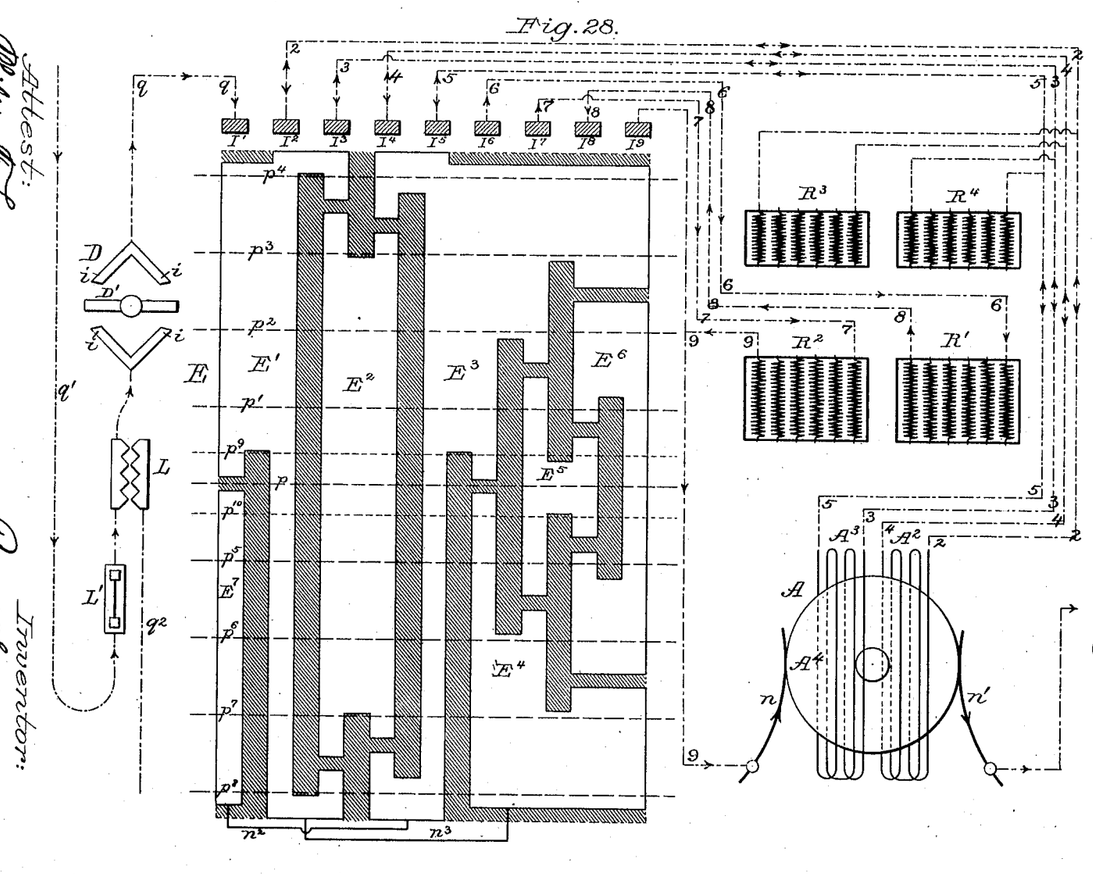
Fig. 28 is another diagrammatic illustration of a similar complete electric system embodying a different arrangement of the contact-blocks on the switch-cylinder.

In Fig. 28, Sheet VI, is shown the same switch with a somewhat different arrangement of the connecting-blocks on the cylinder. Here the current enters from the trolley over fuse L' and breaking-switch D to I' and enters the switch-cylinder. In the intermediate position $p^9$, between rest $p$ and very slow speed $p'$, when the breaking-switch D establishes connection the current passes from I', over block E', to brush $I^2$, via wire 2 to field-coil $A^2$, back via 4 to $I^4$, over block $E^2$ to $I^3$, via 3 to the other field-coil $A^3$, back via 5 to $I^5$, and over block $E^3$ to $I^6$, thence over 6 to resistance R', and back via 8 to $I^8$, and over block $E^5$ to $I^7$, thence by wire 7 to resistance $R^2$, via 9 to the armature-brush $n$ through armature $A^4$, over brush $n'$, to the return. When reaching position $p'$, resistance $R^2$ is cut out and the current passes directly from $I^8$, over $E^6$ to $I^9$, via 9 to the armature. In position $p^2$ both resistances R' and $R^2$ are connected in multiple arc in the same manner as shown in Fig. 27, and the same safety shunt-resistances $R^3$ and $R^4$ are provided to give a passage for the inductive or extra currents. To stop the motor, the same operation as shown in Fig. 27 is provided, backward motion of the switch-cylinder reversing the cycle of operation from $p^4$, over $p^3$ $p^2$ $p'$ to $p$, with this added improvement. After the breaking-contact D has disconnected the motor from the line in position $p^9$ the whole field is short-circuited, in position $p$, by the brushes I' and $I^6$ bridging the gaps between E' and $E^7$ and between $E^3$ and $E^4$, respectively, whereby any possibility of inductive discharge from the field-coils is avoided, the closed field-circuits affording path for the extra currents. To obtain backward motion, the switch-cylinder is rotated in the reverse direction after the short circuit of the field has been broken by the brushes I' and $I^6$, leaving blocks E' and $E^3$, respectively. In intermediate position $p^{10}$ the breaking-switch D establishes contact between motor and trolley-line, and the current entering over brush I' passes from block $E^7$ through connecting-wire $n^2$ to block $E^3$, thence through the field-coils in the opposite direction to that in $p^9$ to $p^4$, thereby causing rotation of the motor in opposite direction to that in $p^9$ to $p^4$, thereby causing rotation of the motor in opposite direction. It now leaves the field over brush $I^2$ and passes from block E' to $E^4$, over connecting-wire $n^3$, and from $E^4$ through resistances and armature in the same way as for forward motion.

In working the locomotive from a halt forwardly to full speed the last-described arrangement of circuits involves the following variations in connections: first, one resistance in motor-circuit and in series with armature and field; second, resistance in multiple arc, but in series with armature and field; third, resistance wholly cut out and field and armature in series; fourth, field-coils in multiple arc in series with the armature. In all of these positions the field-coils are shunted by the resistance-coils $R^3$ and $R^4$.

In stopping the motor while the switch-cylinder moves from position $p^4$ to $p$ the changes described are reversed in their order. In driving the locomotive backwardly the switch-cylinder changes position from $p$ to $p^5$ and $p^6$, (the latter being the slow-speed point,) which reverses the current in the field, the other connections being the same, as when the line $p^2$ was occupied first only one resistance is in service and then both resistances in multiple arc.

Having thus described my invention, I claim as new and desire to secure by Letters Patent—

1. In an electric-locomotive organization, the combination substantially as hereinbefore described, of a wheeled truck; a lever-frame, having two parallel sides, hinged at their ends to two end pieces, and forming a substantially rectangular parallelogram which is located centrally with reference to the wheels and their axles; suitable brake-shoes, with brake-beams for the two pairs of wheels; flexibly-jointed links coupling the sides of said frame to the brake-beams; and means (as chains and hand brake-levers) connected with the sides of said frame at opposite points, for enabling a car-driver to change the form of said lever-frame, and to thereby force the brake-beams with the shoes into braking contact with the tread-faces of the wheels, said braking mechanism affording central space beneath a car and between the axles, available for the reception of apparatus essential to the locomotive.

2. In an electrically-operated car or locomotive the combination substantially as hereinbefore set forth, of an electric motor carried centrally between two axles, a substantially rectangular flexibly-jointed lever-frame adjacent to the motor, brake-beams and shoes for the wheels of both axles; links connecting said beams with the sides of said frame, and hand brake-levers, at the ends of the car which are coupled to the sides of said frame near diagonally opposite corners, whereby manipulation of either hand brake-lever, will change the form of the lever-frame, and cause the brake to be operated simultaneously upon both pairs of wheels.

3. In an electric car or locomotive, the combination with a car-driver's rotative switch-lever, of a stop or abutment substantially as described, which normally restricts the movement of the lever to a given number of turns forwardly, and backwardly, but which by special manipulation, will enable it to be further rotated backwardly for effecting changes in the electric connections appropriate to the reversal of the motor.

4. In an electric locomotive, the combination with a rotative controlling device, of a stop, actuated by, and moving toward and from said device in accordance with the rotation of said device.

5. In an electric locomotive, the combination with a rotative controlling device, of an adjustable stop, actuated by said device and moving in accordance with the rotation of said controlling device.

6. In an electric car or locomotive, the combination of a motor-switch, a controlling-shaft geared to said switch, and operated as by a hand-wheel or crank-lever, of mechanism for restricting the rotation of said lever, consisting of a non-rotative stop-nut mounted upon a screw revolving with said shaft, and an arm which is carried by said shaft and rotative therewith, and is adapted to abut against said stop-nut at the termination of that extent of rotation by said shaft which is requisite for fully operating the switch, and to again abut against said stop-nut, at the end of its return rotative movement, substantially as described.

7. In an electric car or locomotive, the combination of a motor-switch, a controlling-shaft provided with a hand-crank adapted to tilt thereon; a non-rotative stop-nut upon a screw revolving with said shaft, and an abutting arm, carried by the hand-crank, which is normally adapted to abut against said stop-nut at the termination of rotations appropriate to starting, driving, and stopping the car, but which may be made to avoid abutting with the stop-nut by tilting said hand-crank, for operating the switch so that the car may be driven backwardly.

8. In an electric-locomotive organization an electric motor having field-coils divided into sets or sections, in combination with shunt-resistances, each separately connected with the terminals of appropriate field-coil sections, substantially as described.

9. In an electric-locomotive organization, the combination substantially as hereinbefore described, of an electric motor having a casing or frame, which in part longitudinally surrounds the armature of the motor; field-coils which also similarly surround the armature, and are within said casing, and are divided into separate sections or divisions, and one or more resistances in shunt-circuit with one or more of said field-coil sections.

10. In an electric-locomotive organization, the combination substantially as hereinbefore described, of an electric motor; separate sets of resistances; appropriate electric connections and a switching device, which initially couples the resistances in series, as for starting the locomotive, then cuts the resistances out entirely, then couples them in multiple arc, and finally cuts them out as for half and full speed.

11. In an electric-locomotive organization, the combination with a motor having field-coils in separate divisions or sections, of resistances in separate sections, appropriate electric connections, and a switching device adapted as described, to first couple the several resistance-sections in series with each other, and in series with the armature and field-coils, then cut a part of said resistances out, and to then couple the resistances in multiple arc but kept in series with the motor-armature and field, and to then cut out said resistances, leaving the field-coil divisions in series with the armature and each other, then couple the field-coils in mutiple arc and in series with the armature.

12. In an electric-locomotive organization, the combination substantially as hereinbefore described, of the electric motor having field-coils in separate sections, separate resistances in shunt connection with the terminals of the field-coil sections; other separate resistances in the motor-circuit; appropriate electric connections and switching mechanism as described, which controls the supply of current to the motor, by first exciting the field-coil sections in series with each other, and in series with the several separate resistances in the motor-circuit; then changes the coupling of the said resistances from series to multiple arc, and then cuts out said resistances and couples the field-coil sections in multiple arc, the said several changes being reversely repeated during the operation of the switching device as for stopping the motor, during which operations the said shunt-resistances guard against the adverse effects of extra currents in the field-coils.

RUDOLF EICKEMEYER.

Witnesses:
LESLIE M. SAUNDERS,
JAMES S. FITCH.